United States Patent [19]
De Rijck

[11] Patent Number: 5,293,263
[45] Date of Patent: Mar. 8, 1994

[54] ELECTRO-OPTICAL MODULATOR WHICH PROVIDES OPTICAL BIAS STABILIZATION DURING OPERATION

[75] Inventor: Alexander C. De Rijck, Eindhoven, Netherlands

[73] Assignee: U.S. Philips Corporation, New York, N.Y.

[21] Appl. No.: 860,866

[22] Filed: Mar. 31, 1992

Related U.S. Application Data

[63] Continuation-in-part of Ser. No. 580,241, Sep. 7, 1990.

[30] Foreign Application Priority Data

Apr. 3, 1991 [EP] European Pat. Off. ........ 91200774.7

[51] Int. Cl.$^5$ ...................... H04B 10/04; H04B 10/06
[52] U.S. Cl. ................................. 357/180; 359/181; 359/187; 359/194; 372/29; 372/31; 372/38
[58] Field of Search ............... 359/180, 181, 182, 183, 359/184, 185, 186, 187, 188, 194, 195, 161; 372/29, 31, 32, 38

[56] References Cited

U.S. PATENT DOCUMENTS

| | | | |
|---|---|---|---|
| 4,504,976 | 3/1985 | Beaudet | 372/31 |
| 4,884,280 | 11/1989 | Kinoshita | 372/29 |
| 5,018,155 | 3/1991 | Miyairi | 372/29 |
| 5,127,015 | 6/1992 | Chikugawa et al. | 372/29 |

FOREIGN PATENT DOCUMENTS 4142128 2/1990 Japan .................................. 359/180

OTHER PUBLICATIONS

12th European Conference On Optical Communication, ECOC 1986, Technical Digest vol. 1, Sep. 22–25, 1986, Barcelona, Spain, pp. 321–324.

Primary Examiner—Richard E. Chilcot, Jr.
Assistant Examiner—Rafael Bacares
Attorney, Agent, or Firm—Leroy Eason

[57] ABSTRACT

An optical transmitter comprising a control loop for stabilizing the bias current which sets a bias level of the amount of light emitted by a laser diode 6. A cascade circuit 5 which includes the laser diode 6, a photodiode 7 and a variable gain control amplifier 8 is connected in the negative feedback path of the control loop. To prevent amplitude modulation of the bias current when a modulation signal occurs at the input of the gain control amplifier, the control loop produces a cancelling signal of a magnitude which cancels the mean value of such modulation signal. The cancelling signal is derived from the modulation signal in a fixed manner, by fixing the transfer factor of the negative feedback path as measured by transmission of an auxiliary signal through such path and adjusting the gain of amplifier 8 in accordance with the result of such measurements.

12 Claims, 4 Drawing Sheets

ELECTRO-OPTICAL MODULATOR WHICH PROVIDES OPTICAL BIAS STABILIZATION DURING OPERATION

This is a continuation-in-part of application Ser. No. 07/580,241, filed Sept. 7, 1990.

BACKGROUND OF THE INVENTION

1. Field of the Invention

The invention relates to an optical transmitter comprising a combination of an electro-optical converter and an opto-electrical converter which are optically coupled, which combination is included in the negative feedback path of a control loop, the input of the electro-optical converter being coupled to the input of the negative feedback path and the output of the opto-electrical converter being coupled to the output of the negative feedback path. The control loop includes a control amplifier, the output of the negative feedback path being coupled to an input of the control amplifier and the output of the control amplifier being coupled to a first input of combining means whose output is coupled to the input of the negative feedback path. Modulation signal is applied to a second input of the combining means.

2. Description of the Related Art

A transmitter of this type is described in U.S. Pat. No. 4,504,976. Transmitters of this type may be used, for example, in optical recording systems and in optical telecommunication systems.

In these systems the electro-optical converter is often desired to be biassed, so that it generates a certain amount of light even when a modulation signal is absent. In optical recording systems this is desired because the light generated when a modulation signal is absent is used to read information from a record carrier. In digital telecommunication systems the bias is desired because it increases the maximum attainable modulation frequency of the electro-optical converter. This is caused by the fact that the switch-on delay of a fully switched-off electro-optical converter is much longer than the delay in the increasing amount of light generated by an electro-optical converter to a given value from a bias level of the converter.

The electro-optical converters used in systems of this type generally have a strong threshold characteristic. This is to say, the current flowing through the electro-optical converter must exceed a specific threshold value before the converter emits light. This threshold is strongly temperature-dependent and furthermore exhibits a large variation per specimen.

Because the threshold of the current flowing through the electro-optical converter exhibits a large variation, it is not readily feasible to bias the amount of light generated by the electro-optical converter by means of a fixed bias current of the converter.

In order to nevertheless obtain a well-determined bias of the generated light, the electro-optical converter is generally included in the negative feedback path of of a control loop together with an opto-electrical converter, a fraction of the light emitted by the electro-optical converter being applied to the opto-electrical converter. Since the opto-electrical converter is included in the negative feedback path, the output signal of the opto-electrical converter and thus also the amount of light generated by the electro-optical converter is maintained at a predetermined value by the control loop.

Generally, the amount of light emitted by the electro-optical converter can be amplitude modulated by coupling the modulation signal to the input of the gain control amplifier. However, this leads to a restriction of the maximum permissible frequency of the modulation signal, because the gain control amplifier preferably has a high gain factor and thus a limited bandwidth.

In the transmitter known from said U.S. Pat. No. 4,504,976, the light emitted by the electro-optical converter is amplitude modulated by coupling the modulation signal directly to the input of the negative feedback path so that the limiting effect of the gain control amplifier on the maximum permissible frequency of the modulation signal is eliminated. A problem is then that the control loop tries to maintain the output signal of the negative feedback path and thus also the amount of light emitted by the electro-optical converter at a constant level, and is thus capable of reducing or even fully cancelling the effect of the modulation signal on the emitted amount of light.

In this known transmitter it is possible to apply a high-frequency modulation signal to the input of the negative feedback path and to arrange the control loop in such a way that it is only active for low frequencies, so that the control loop now no longer affects the relation between the modulation signal and the emitted amount of light. A drawback of this is that the transmitter is then unsuitable for modulation signals which comprise a DC component.

SUMMARY OF THE INVENTION

It is an object of the invention to provide a transmitter of the kind described in the opening paragraph which is suitable even for modulation signals which comprise a DC component.

For this purpose, the transmitter is characterized in that the transmitter comprises cancelling means for deriving a cancelling signal from the modulation signal and applying this cancelling signal to the control loop at a location which as seen in the direction of the signal transport is downstream of the opto-electrical converter and upstream of the gain control amplifer, so as to render the output signal of the gain control amplifer independent of the modulation signal.

As a result of these measures an amount of light proportional to the modulation signal is added to the emitted amount of light at the bias level, without this addition affecting the bias as occurs in the previous state of the art.

The transfer factor of the negative feedback path is sometimes not determined very accurately because the properties of the electro-optical and opto-electrical converters exhibit a strong variation per specimen, are temperature-dependent and are furthermore subject to slow variations with time due to ageing. For different transmitters the magnitude of the cancelling signal should therefore be set separately for each particular combination of electro-optical and opto-electrical converters, which would entail additional manufacturing costs. In order to eliminate this drawback, the transmitter is characterized in that the negative feedback path comprises a cascade circuit including an electro-optical converter, an opto-electrical converter and an automatic gain control, amplifer, in an auxiliary gain control signal is applied to a third input of the combining means. The transmitter comprises means for fixing the transfer factor of the cascade circuit at a predetermined value on the basis of the component of the output signal of the cascade circuit which originates from the auxiliary gain control signal, by setting the gain factor of the automatic gain control amplifer at a correct value.

By setting the transfer factor of the negative feedback path at a fixed value which is independent of the properties of the electro-optical converter and the opto-electrical converter, the transfer factor is known and so cancelling signal may be used which is derived from the modulation signal in a fixed, predetermined manner.

It should be observed that the use of an auxiliary signal for fixing the gain factor of a cascade connection constituted by an electro-optical converter, an opto-electrical converter and an automatic gain control amplifer at a constant value, is known from above U.S. patent. However, in the known optical transmitter, the automatic gain control is not included in the negative feedback path of the control loop. The use of the cascade connection in the known transmitter furthermore serves a second purpose, that is to say, obtaining a modulated light signal that has an amplitude that is independent of variations in the properties of the electro-optical converter.

An embodiment of the invention is characterized in that the combining means comprise an adder.

Because adding circuits are simple to realise, arranging the combining means by way of an adding circuit results in a simplification of the transmitter according to the invention.

A further embodiment of the invention is characterized in that the negative feedback path has a low-pass frequency characteristic and in that the cancelling signal, which is the negative of the product, the negative feedback path transfer factor and the mean value of the modulation signal is coupled to the output of the negative feedback path.

If the negative feedback path has a low-pass characteristic so that only the mean value of the modulation signal is transferred, the cancelling signal only needs to cancel the mean value of the modulation signal. Therefore the cancelling signal may be derived from the mean value of the modulation signal. Deriving the mean value of the modulation signal may be effected by means of a low-pass filter.

By making the cancelling signal equal to the negative of the product of the mean value of the modulation signal and the transfer factor of the negative feedback path, the cancelling signal will be of the same magnitude but opposite in sign to the output signal component of the negative feedback path, which component originates from the modulation signal and is supplied in the input of the control amplifier. By also feeding the cancelling signal to the input of the amplifier control, the input signal of the net control amplifier and thus also the output signal thereof will be independent of the modulation signal.

An alternative embodiment of the invention is characterized, in that the amplifier control has a low-pass frequency characteristic and in that the cancelling signal, which is the negative of the product of the transfer factor of the negative feedback path and the value of the modulation signal, is coupled to the output of the negative feedback path.

If the control amplifier has a low-pass characteristic, so that only the mean value is transferred of the output signal component of the negative feedback path, which component originates from the modulation signal, the cancelling signal may be equal to the negative of the product of the transfer factor of the negative feedback path for a constant signal (DC) and the value of the modulation signal. Not all of the high-frequency components in the output signal of the negative feedback path and in the cancelling signal will be transferred by the gain control amplifier. However, the mean value of the output signal component of the negative feedback path, which component originates from the modulation signal, will still be cancelled by the mean value of the cancelling signal.

A specific embodiment of the invention is characterized in that the output of the opto-electrical converter is coupled to the input of the automatic gain control amplifier.

By inserting the automatic gain control amplifier downstream of the opto-electrical converter, the bias of the emitted light signal will be independent of the opto-electrical converter. Because the control loop maintains the output signal of the negative feedback path at a constant value, and because also the transfer factor of the negative feedback path is maintained at a constant value, the input signal of the negative feedback path and thus the input signal of the cascade connection will also be constant. Since the bias of the amount of light emitted by the electro-optical converter will be solely determined by the constant part of the input signal of the cascade connection and the properties of the electro-optical converter, the amount of light emitted by the electro-optical converter will be independent of the properties of the opto-electrical converter.

BRIEF DESCRIPTION OF THE DRAWINGS

Hereinbelow the invention will be further explained with reference to the drawing Figures, in which.

DESCRIPTION OF THE PREFERRED EMBODIMENTS

Figure 1:
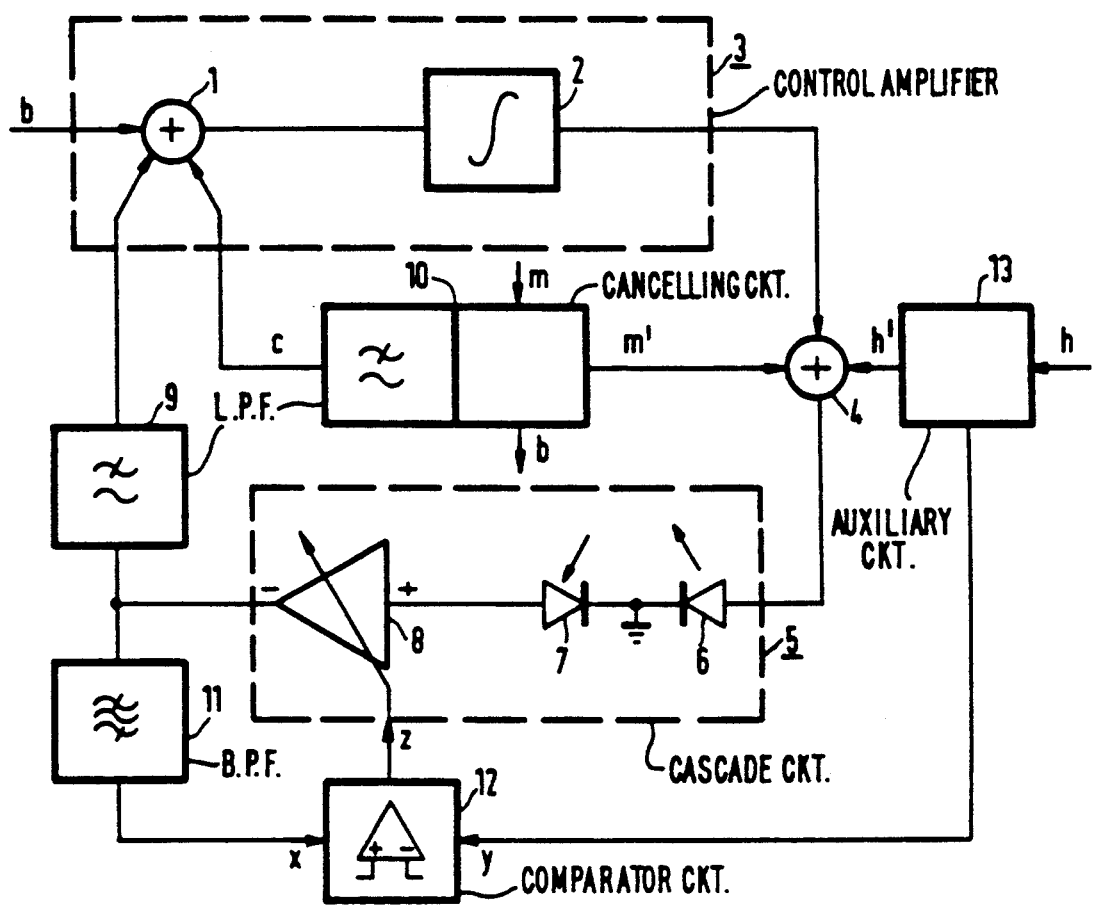
FIG. 1 shows a block diagram of a transmitter according to the invention.

In FIG. 1 a reference signal b generated by a cancelling circuit 10 is fed to a first input of a control amplifier 3 constituted by a summator 1 and an integrator 2. The output of summator 1 is connected to the input of the integrator 2. The output of the integrator 2 is connected to a first input of a combining means which in this case is constituted by a summator 4. The output of the summator 4 is connected to the input of an electro-optical converter whose input is formed in this case by the anode of a laser diode 6. The cathode of the laser diode 6 is connected to a point of reference potential to be termed earth hereinafter. The laser diode 6 is optically coupled to an opto-electrical converter constituted by a photodiode 7. The cathode of the photodiode 7 is also connected to earth. The anode of the photodiode 7 is connected to the input of an automatic gain control amplifier 8. The combination of laser diode 6, photodiode 7 and automatic gain control amplifier 8 will be referred to as a cascade circuit 5. The output of the automatic gain control amplifier 8 is connected to the input of a low-pass filter 9 whose output is connected to a second input of the summator 1. The output of the automatic gain control amplifier 8 is also connected to the input of a band-pass filter 11. A negative feedback path is formed by the cascade circuit 5, the low-pass filter 9 and the summator 1.

An auxiliary signal h is fed to an input of an auxiliary circuit 13. A first output of the auxiliary circuit 13 carrying output signal h' is connected to a second input of the summator 4. A second output of the auxiliary circuit 13 carrying output signal y is connected to a first input of a comparator circuit 12. The output of the band-pass filter 11, carrying output signal x, is connected to a second input of the comparator circuit 12. The output of the comparator circuit 12, carrying output signal z, is connected to a control input of the inverting amplifier 8. A modulation signal m is fed to an input of the cancelling circuit 10. A first output of the cancelling circuit 10, carrying output signal m', is connected to a third input of the summator 4. A second output of the cancelling circuit 10, carrying output signal c, which signal forms the cancelling signal in accordance with the invention, is connected to an input of the summator 1.

In FIG. 1 a control loop for fixing the bias of the amount of light emitted by the laser diode 6 is formed by the control amplifier 3, the summator 4, the cascade circuit 5 and the low-pass filter 9. The control loop maintains the value of the output signal of the negative feedback path at $-b$, which signal is constituted in this case by the output signal of the low-pass filter 9, as a result of which the signal at the output of control amplifier 3 produces a bias level of the amount of light U emitted by the laser diode 6 given by, $$U = \frac{b}{d \cdot A} \qquad (1)$$

In (1) d is the light intensity-to-current intensity conversion factor of the photodiode 7 and A is the gain factor of the amplifier 8.

The auxiliary circuit 13 derives two signals, h' and yx, from an auxiliary signal h which is sinusoidal. The auxiliary signal h' is applied to the input of the cascade circuit 5 via the summator 4. The band-pass filter 11 passes only the component of the output signal of cascade circuit 5 which originates from the auxiliary signal h'. For equalizing the signals x and y, the amplitudes of the signals x and y are compared in the comparator circuit 12 and a signal z for setting the gain factor of the amplifier 8 at the correct value is derived from the result of this comparison. By adapting the gain factor of the amplifier 8 so that the signals x and y are equal, the transfer factor of the cascade circuits and in this case also the transfer factor of complete negative feedback path is fixed at a constant value $C_1$ for low frequencies. For this transfer factor it now holds:

$$C_1 = L \cdot d \cdot A \qquad (2)$$

In (2) L is the current intensity-to-light intensity conversion factor of the laser diode 6. For the product d·A there may be written:

$$d \cdot A = \frac{C_1}{L} \qquad (3)$$

For the bias level U of the amount of light emitted by the laser diode 6 one now finds by substituting (3) in (1):

$$U = \frac{b \cdot L}{C_1} \qquad (4)$$

Thus the light bias level U is now exclusively determined the constants b and $C_1$ and by the properties of the laser diode 6, not by the properties of the photodiode 7.

In order to modulate the amount of light emitted by the laser 6, the signal m' derived from the modulation signal m is applied to the summator 4. According to the invention, the cancelling signal c is derived from the modulation signal m by way of the cancelling means formed in this case by the cancelling circuit 10, and applied to the summator 1. In cancelling circuit 10 the cancelling signal c is obtained by sending the modulation signal through a low-pass filter. Since the transfer factor of the negative feedback path is fixed at a value $C_1$ for low frequencies, and since the transfer function of the cancelling circuit 10 is provided to be equal to $-C_1$ for the DC component of the modulation signal, the DC voltage value of the output signal c of the cancelling circuit 10 will have an equal magnitude but opposite sign from the DC component of the voltage produced the output of the low-pass filter 9 by the modulation signal supplied to laser diode 6. As a result of the summation of these signals in summator 1, they cancel each other out, and so the DC component of the modulation signal does not have any effect on the control loop. The low-pass filter 9 provide a low-pass characteristic in the negative feedback path in accordance with the invention.

The signals fed to the summator 4 are signal streams, so that the summation thereof can be realised by simply interconnecting the inputs of the summator. The output signal of the photodiode 7 is also a current, whereas the output signal of the amplifier 8 is a voltage, so that the amplifier 8 is arranged as a current-to-voltage converter.

Figure 2:
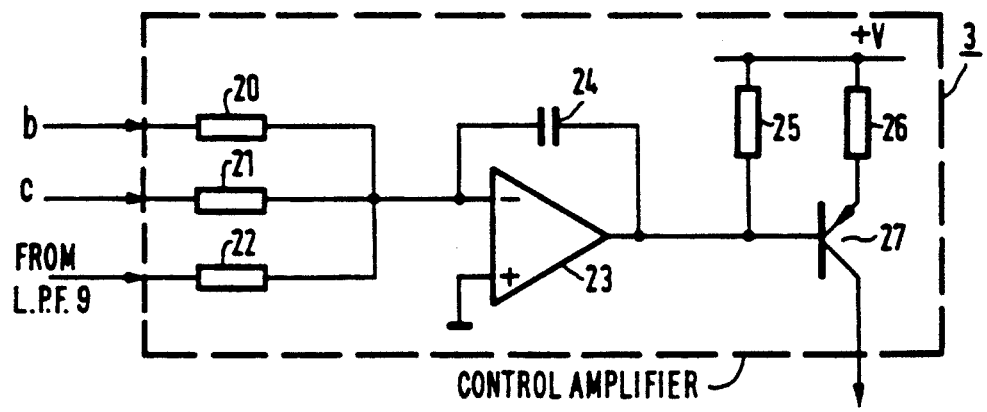
FIG. 2 shows a gain control comprising a summator and an integrator to be used in a transmitter as shown in FIG. 1.

FIG. 2 shows control amplifier 3 in more detail. Therein the three inputs are connected each to one of mutually equal resistors 20, 21 and 22 which are all connected in common to the inverting input of an operational amplifier 23. The inverting input of the operational amplifier 23 is also connected to a terminal of a capacitor 24. The non-inverting input of the operational amplifier 23 is connected to earth. The output of the operational amplifier 23 is connected to a second terminal of the capacitor 24, to a first terminal of a resistor 25 and to the base of a PNP transistor 27. A second terminal of the resistor 25 is connected to a positive supply voltage $+V$. The emitter of the transistor 27 is connected to a first terminal of a resistor 26, a second terminal of the resistor being connected to the positive supply voltage $+V$. The output of the control amplifier 3 is at the collector of the transistor 27.

In the control amplifier shown in FIG. 2 the operational amplifier 23, as a result of a known property of a negative feedback operational amplifier, will cause the voltage between its input terminals to be zero, so that the potential on the inverting input of the operational amplifier 23 is at earth potential. Due to the zero voltage difference between the inputs of the operational amplifier 23, all the current from the resistors 20, 21 and 22 will flow into the capacitor 24. The current supplied to the capacitor 24 therefore equals the quotient of the sum of the voltages on the three inputs of the control amplifier and the resistance of the mutually equal resistors 20, 21 and 22. The capacitor 24 integrates this sum, so that on the output of the operational amplifier 23 there is a voltage which is proportional to the integral of the sum of the three input voltages of the control amplifier 3. The transistor 27 and the resistor 26 together form a voltage-to-current converter converting the output voltage of the operational amplifier 23 into an output current at the collector of transistor 27.

Figure 3:
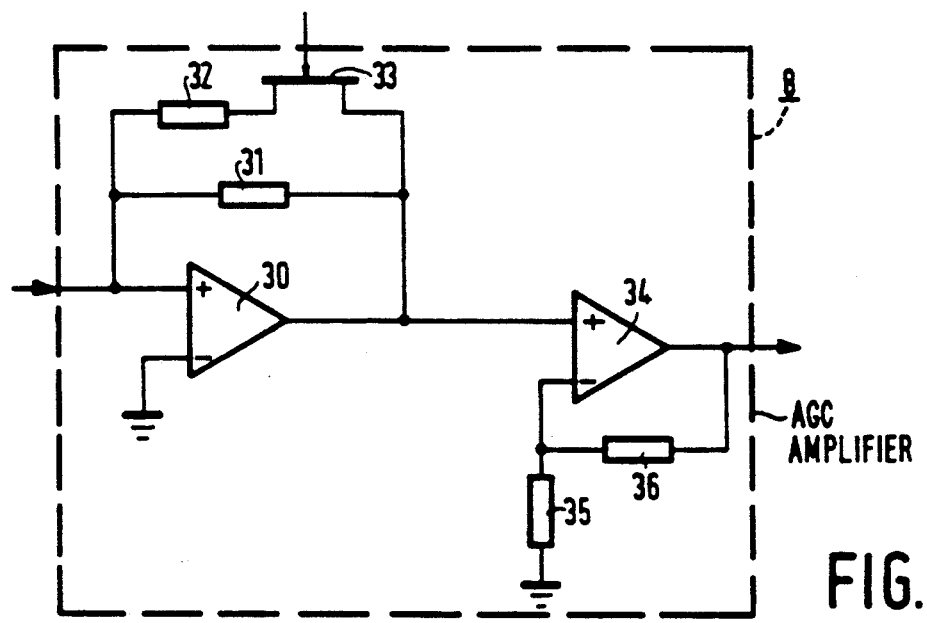
FIG. 3 shows an automatic gain control 8, to be used in a transmitter as shown in FIG. 1.

In FIG. 3 the input of the automatic gain control amplifier 8, which is arranged as a current-to-voltage converter, is at the common junction of the non-inverting input of an operational amplifier 30, a first terminal of a resistor 31 and a first terminal of a resistor 32. The inverting input of the operational amplifier 30 is connected to earth. A second terminal of the resistor 32 is connected to the source of a field-effect transistor 33. The drain of the field-effect transistor 33 is connected to the output of the operational amplifier 30. The output of the operational amplifier 30 is also connected to a second terminal of the resistor 31 and to the non-inverting input of an operational amplifier 34. The inverting input of the operational amplifier 34 is connected to a first terminal of a resistor 35 and to a first terminal of a resistor 36. A second terminal of the resistor 36 is connected to the output of the operational amplifier 34 whilst a second terminal of the resistor 35 is connected to earth.

The automatic gain control amplifier 8 is shown in more detail in FIG. 3, wherein the control is realised by means of the current-to-voltage converter constituted by operational amplifier 30, the resistors 31 and 32 and the field-effect transistor 33. As a result of a known property of negative feedback operational amplifiers, the operational amplifier 30 will control the voltage difference between its inputs to zero, so that the non-inverting input of the operational amplifier 30 will adopt the earth potential. Due to the lack of voltage difference between the two inputs of the operational amplifier 30, all the current fed to the input will flow through the negative feedback network constituted by the resistors 31 and 32 and the field-effect transistor 33. Because the impedance of the negative feedback network can be adjusted by means of the gate voltage of the field-effect transistor 33, the transfer factor of the current-to-voltage converter will also be adjustable. The resistors 31 and 32 are included to fix the maximum and the minimum value of the transfer factor of the current-to-voltage converter at a certain value. The current-to-voltage converter proper is followed by a conventional non-inverting amplifier which is constituted by operational amplifier 34, resistor 35 and resistor 36.

Figure 4:
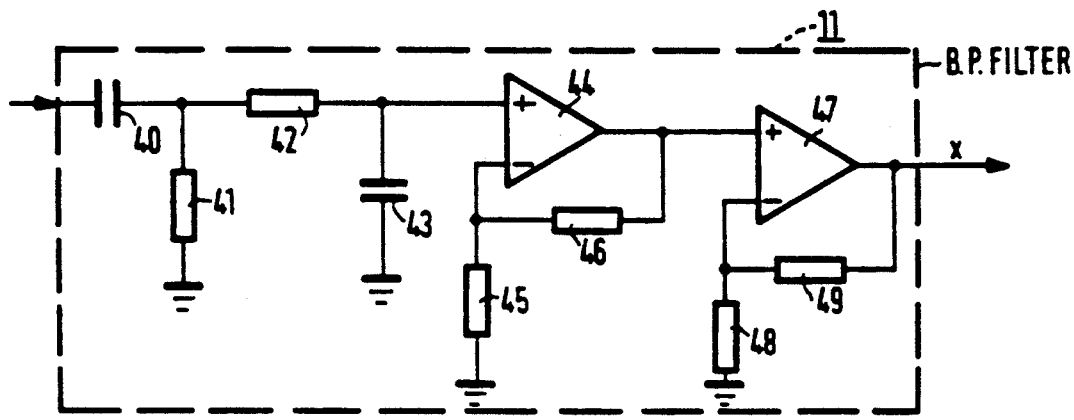
FIG. 4 shows a band-pass filter 11 to be used in a transmitter as shown in FIG. 1.

In the band-pass filter shown in FIG. 4 the input is at a first terminal of a capacitor 40. A second terminal of the capacitor 40 is connected to a first terminal of a resistor 41 and to a first connecting point of a resistor 42. A second connecting point of the resistor 41 is connected to earth. A second terminal of the resistor 42 is connected to a first terminal of a capacitor 43 and to the non-inverting input of an operational amplifier 44. The inverting input of the operational amplifier 44 is connected to a first terminal of a resistor 45 and to a first terminal of a resistor 46. A second terminal of the resistor 45 is connected to earth whilst a second connecting point of the resistor 46 is connected to the output of the operational amplifier 44. The output of the operational amplifier 44 is connected to the non-inverting input of an operational amplifier 47. The inverting input of the operational amplifier 47 is connected to a first connecting point of a resistor 48 and to a first connecting point of a resistor 49. A second terminal of the resistor 48 is connected to earth whilst a second connecting point of the resistor 49 is connected to the output of the operational amplifier 47, which output likewise forms the output of the band-pass filter.

In FIG. 4 the capacitor 40 and the resistor 41 constitute a high-pass filter, whilst the resistor 42 and the capacitor 43 constitute a low-pass filter. By cascading the high-pass filter characteristic and the low-pass filter, a band-pass filter is obtained. The output signal of the band-pass filter is available at the junction of the resistor 42 and the capacitor 43. The signal available there is amplified to often an output signal x by means of two cascaded conventional non-inverting amplifiers constituted by the operational amplifier 44 and the resistors 45 and 46, as well as the operational amplifier 47 and the resistors 48 and 49, respectively.

Figure 5:
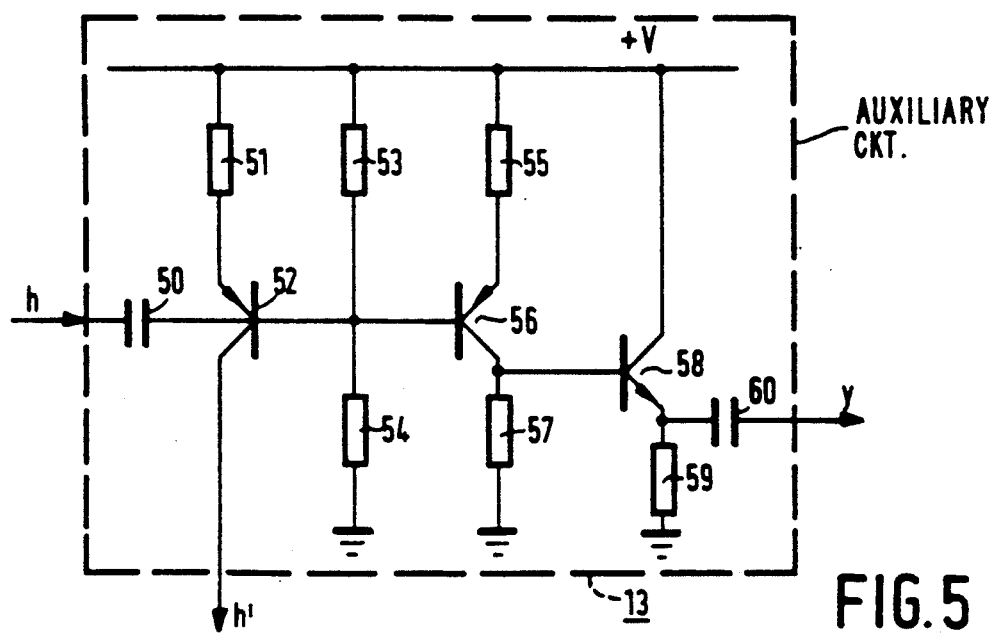
FIG. 5 shows an auxiliary circuit generating the signals h' and y, to be used in a transmitter as shown in FIG. 1.

The auxiliary circuit 13 in FIG. 1 is shown in more detail in FIG. 5, wherein the auxiliary signal h is applied to a first connecting point of a capacitor 50. A second terminal of the capacitor 50 is connected to the base of a PNP transistor 52, to the base of a PNP transistor 56, to a first terminal of a resistor 53 and to a first terminal of a resistor 54. The emitter of the transistor 52 is connected to a first terminal of a resistor 51. A second terminal of the resistor 51 is connected to the positive supply voltage +V. The collector of the transistor 52 forms a first output of the auxiliary circuit 13 and carries output current h'.

A second terminal of the resistor 53 is connected to the positive supply voltage +V, whilst a second terminal of the resistor 54 is connected to earth. The emitter of the transistor 56 is connected to a first terminal of a resistor 55. A second terminal of the resistor 55 is connected to the positive supply voltage +V. The collector of the transistor 56 is connected to a first terminal of a resistor 57 and to the base of an NPN transistor 58. A second terminal of the resistor 57 is connected to earth. The collector of the transistor 58 is connected to the positive supply voltage +V and the emitter of the transistor 58 is connected to a first terminal of a capacitor 60 and to a first terminal of a resistor 59. A second connection point of the resistor 59 is connected to earth. A second terminal of the capacitor 60 forms the second output of the auxiliary circuit 13 and carries output signal y.

A first part of the auxiliary circuit comprises a voltage-to-current converter constituted by the transistor 52 and the resistor 51. The transistor 52 is biassed by means of the voltage divider constituted by the resistors 53 and 54. The auxiliary signal h is transferred to the base of the transistor 52 by means of the capacitor 50, so that the input voltage h is converted into an output current h'. The voltage h is furthermore coupled to the input of an inverting amplifier constituted by the transistor 56 and the resistors 55 and 57. The bias current of the transistor 56 is also fixed by the resistors 53 and 54. The collector of transistor 56 now carries an amplified version of the voltage h. This voltage is transferred to the output as the signal y by means of a capacitor 60 via an emitter-follower constituted by the transistor 58 and the resistor 59. Capacitor 60 is present to block the transfer of DC voltage transfer from the emitter of the transistor 58 to the output.

Figure 6:
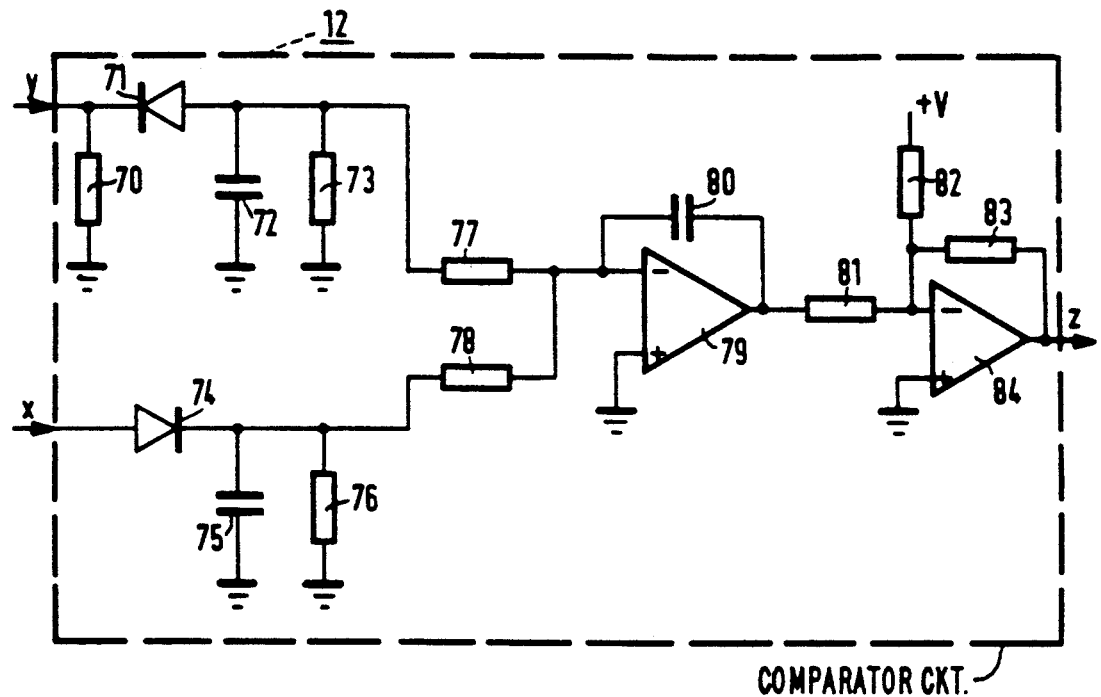
FIG. 6 shows a comparing circuit 12 to be used in a transmitter as shown in FIG. 1.

In the comparator circuit 12 as shown in FIG. 6, the input signal y is applied to a first terminal of a resistor 70 and to the cathode of a diode 71. The anode of the diode 71 is connected to a first terminal of the capacitor 72, to a first terminal of a resistor 73 and to a first terminal of a resistor 77. A second terminal of the resistor 70, a second terminal of the capacitor 72 and a second terminal of the resistor 73 are connected to earth. A second terminal of the resistor 77 is connected to the inverting input of an operational amplifier 79. The input signal x is fed to the anode of a diode 74. The cathode of the diode 74 is connected to a first terminal of a capacitor 75, to a first terminal of a resistor 76 and to a first terminal of a resistor 78. A second terminal of the capacitor 75 and a second terminal of the resistor 76 are connected to earth. A second terminal of the resistor 78 is connected to the inverting input of the operational amplifier 79. The inverting input of the operational amplifier is furthermore connected to a first terminal of a capacitor 80. The non-inverting input of the operational amplifier 79 is connected to earth. A second terminal of the capacitor 80 is connected to the output of the operational amplifier 79. The output of the operational amplifier 79 is furthermore connected to a first terminal of a resistor 81. A second terminal of the resistor 81 is connected to the inverting input of an operational amplifier 84. The inverting input of the operational amplifier 84 is furthermore connected to a first terminal of a resistor 82 and to a first terminal of a resistor 83. The non-inverting input of the operational amplifier 84 is connected to earth. A second terminal of the resistor 82 is connected to the positive supply voltage $+V$. A second terminal of the resistor 83 is connected to the output of the operational amplifier 84. The output of the operational amplifier 84 carries the output signal z of the comparing circuit.

The input signal y is rectified and smoothed by the combination of the diode 71, the capacitor 72 and the resistor 73. The voltage available at the first terminal of the capacitor 72 has a negative sign. The resistor 70 is included for fixing the DC voltage level of the cathode of the diode 71 to earth potential. The input signal x is rectified and smoothed by the combination of the diode 74, the capacitor 75 and the resistor 76. The voltage available at the first terminal of the capacitor 75 has a positive sign. The signals thus obtained are added together and integrated by means of a summating integrator constituted by the resistors 77 and 78, the operational amplifier 79 and the capacitor 80. Due to the different signs of the input signals of the integrator, the integrator output carries a signal proportional to the integrated difference of the amplitudes of the signals y and x. The output signal of the integrator is amplified to the output signal z by means of an inverting amplifier constituted by the resistors 81 and 83 and the operational amplifier 84. The resistor 82 is included to shift the range of the output signal z by a certain value when an output signal of the integrator is absent. This is desired for obtaining a proper biassing of the field-effect transistor 33 in the automatic gain control shown in FIG. 3.

Figure 7:
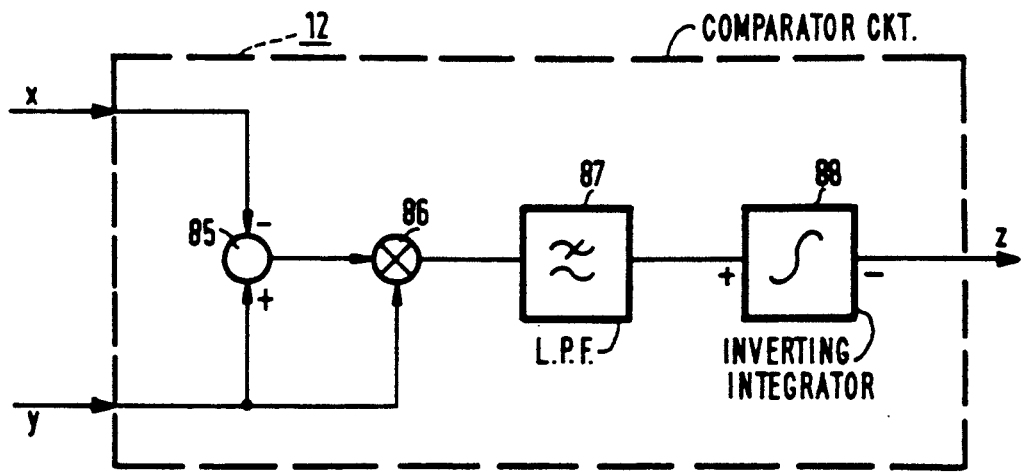
FIG. 7 shows an alternative embodiment of the comparing circuit 12.

In the alternative comparator circuit 12 shown in FIG. 7, the signal y is fed to a positive input of a subtracter 85 and to a first input of a multiplier 86. The signal x is applied to the negative input of the subtracter 85. The output of the subtracter 85 is connected to a second input of the multiplier 86. The output of the multiplier 86 is connected to the input of a low-pass filter 87. The output of the low-pass filter is connected to the input of an inverting integrator 88. The output of the integrator 88 forms the output of the comparing circuit 12.

In subtracter 85 the difference is calculated between the signal x and the signal y proportional to the signal x. At the output of the subtracter 85 a signal is available having an amplitude proportional to the amplitude difference of the signals x and y and having the same frequency as the signal x. By multiplying the difference signal $x-y$ by the signal y in the multiplier, a signal is obtained comprising a DC voltage component which is proportional to the amplitude of the difference signal $x-y$. The low-pass filter 87 passes only the DC voltage component of the output signal of the multiplier 86. By integrating the output signal of the low-pass filter 87 by means of the integrator 88, an output signal z is obtained which is proportional to the integrated value of the amplitude difference of the signals y and x.

Because the product of two sinusoidal voltages can produce a DC voltage only in the case where the frequencies of the two signals are equal, any additional signal components in the signal y having different frequencies from the signal x do not at all affect the value of the output signal z. As a result, the band-pass filter 11 may be omitted if a comparator circuit as shown in FIG. 7 is used in a transmitter as shown in FIG. 1.

Figure 8:
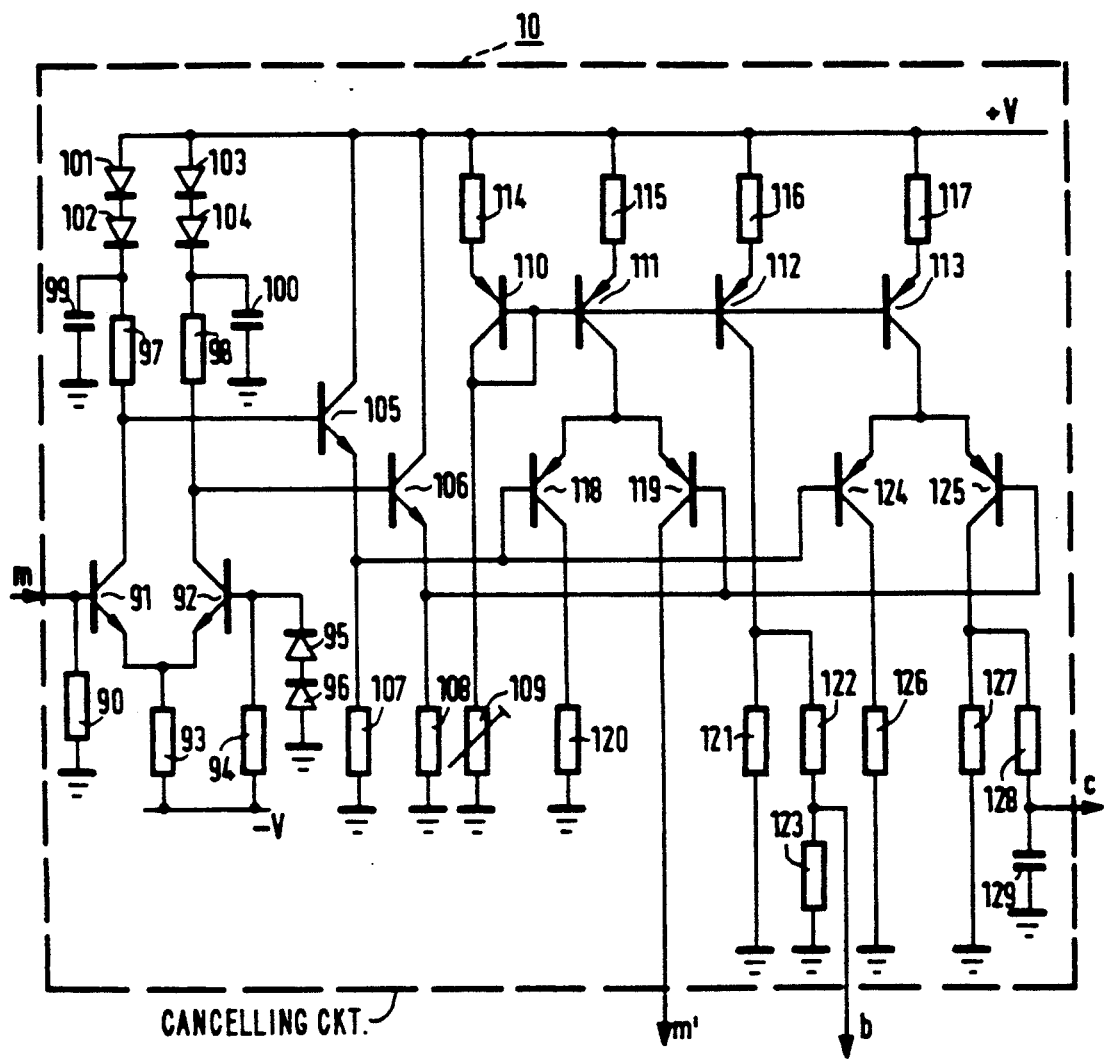
FIG. 8 shows a cancelling circuit generating the signals m', b and c, to be used in a transmitter as shown in FIG. 1.

In the cancelling circuit shown in FIG. 8 the modulation signal m is applied to the base of an NPN transistor 91 and to a first terminal of a resistor 90. A second terminal of the resistor 90 is connected to earth. The emitter of the transistor 91 is connected to the emitter of an NPN transistor 92 and to a first terminal of a resistor 93. A second terminal of the resistor 93 is connected to the negative supply voltage $-V$. The base of the transistor 92 is connected to a first terminal of a resistor 94 and to the cathode of a diode 95. A second terminal of the resistor 94 is connected to the negative supply voltage $-V$. The anode of the diode 95 is connected to the cathode of a diode 96 whilst the anode of the diode 96 is connected to earth.

The collector of the transistor 91 is connected to the base of an NPN transistor 105 and to a first terminal of a resistor 97. A second connecting point of the resistor 97 is connected to a first terminal of a capacitor 99 and to the cathode of a diode 102. A second terminal of the capacitor 99 is connected to earth. The anode of the diode 102 is connected to the cathode of a diode 101. The anode of the diode 101 is connected to the positive supply voltage $+V$. The collector of the transistor 92 is connected to the base of an NPN transistor 106 and to a first terminal of a resistor 98. A second connecting point to the resistor 98 is connected to a first terminal of a capacitor 100 and to the cathode of a diode 104. A second terminal of the capacitor 100 is connected to earth. The anode of the diode 104 is connected to the cathode of a diode 103. The anode of the diode 103 is connected to the positive supply voltage $+V$.

The collector of the transistor 105 is connected to the positive supply voltage $+V$. The collector of the transistor 106 is also connected to the supply voltage $+V$. The emitter of the transistor 105 is connected to a first terminal of a resistor 107, to the base of a PNP transistor 118 and to the base of a PNP transistor 124. A second terminal of the resistor 107 is connected to earth. The emitter of the transistor 106 is connected to a first terminal of a resistor 108, to the base of a PNP transistor 119 and to the base of a PNP transistor 125. A second terminal of the resistor 108 is connected to earth.

A first terminal of a resistor 109 is connected to earth whilst a second terminal of the resistor 109 is connected to the collector and the base of a PNP transistor 110. The base of the transistor 110 is furthermore connected to the base of each of PNP transistors 111, 112 and 113. The emitters of the transistors 110, and 111, 112, and 113 are respectively connected to a first terminal of resistors 114, 115, 116, and, 117. A second terminal of each of the resistors 114, 115, 116, and 117 is connected to the positive supply voltage +V. The collector of the transistor 111 is connected to the emitter of the transistor 118 and to the emitter of the transistor 119. The collector of the transistor 118 is connected to a first terminal of a resistor 120. A second terminal of the resistor 120 is connected to earth. The collector of the transistor 119 forms an output of the cancelling circuit 10 and carries output current m'. The collector of the transistor 112 is connected to a first terminal of a resistor 121 and to a first terminal of a resistor 122. A second terminal of the resistor 121 is connected to earth. A second terminal of a resistor 122 is connected to a first terminal of a resistor 123. A second terminal of the resistor 123 is connected to earth. At the junction between the resistors 122 and 123 the output voltage b is available. A second terminal of the resistor 123 is connected to earth.

The collector of the transistor 113 is connected to the emitter of the transistor 124 and to the emitter of the transistor 125. The collector of the transistor 125 is connected to a first terminal of a resistor 127 and to a first terminal of a resistor 128. A second terminal of the resistor 127 is connected to earth. A second terminal of the resistor 128 is connected to a first terminal of a capacitor 129. A second terminal of the capacitor 129 is connected to earth. At the junction between the resistor 128 and the capacitor 129 the output signal c is available. The collector of the transistor 124 is connected to a first terminal of a resistor 126 whilst a second terminal of the resistor 126 is connected to earth.

The digital modulating signal m applied to the cancelling circuit 10, which signal has ECL signal levels (logic "0"=−1.7 volts relative to earth, logic "1"=−0.9 volt relative to earth) is converted by means of the differential amplifier constituted by the transistors 91 and 92 and the resistors 97 and 98 into a balanced digital signal available at the collectors of the transistors 91 and 92. The bias current of the transistors 91 and 92 is fixed by the resistor 93. The combination of the diodes 95 and 96 and the resistor 94 fixes the potential of the base of the transistor 92 at a value of about −1.3 volts, which value is the average of the two levels of the input signal. With a −0.9 volt input signal the transistor 91 is fully conductive, whereas transistor 92 is cut off. With a −1.7 volts input signal the transistor 91 is fully cut off, whereas transistor 92 is fully conductive. The resistors 97 and 98 fix the value of the signal levels of the balanced output signal. The diodes 101, 102, 103 and 104 fix the DC voltages on the collectors of the transistors 91 and 92 at a desired value. The capacitors 99 and 100 avoid that disturbing signals from the differential amplifier enter the positive supply voltage line.

The symmetrical digital signal at the output of the differential amplifier is buffered by means of two emitter followers constituted by the transistors 105, 106 and the resistors 107, 108 respectively. The buffered symmetrical signal drives two current switches which are both constituted by a differential amplifier. The reference current flowing through the current switches is generated by means of a resistor 109, which current is applied to a current mirror circuit which has three output currents, which current mirror circuit comprises the transistors 110, 111, 112 and 113 and the resistors 114, 115, 116 and 117. The collector current of the transistor 111 is switched by the modulation signal with the aid of the current switch constituted by the transistors 118 and 119. The collector current of the transistor 118 is applied to the resistor 120 and the collector current of the transistor 119 forms the output signal m' of the cancelling circuit 10. The resistor 120 is included for mutually equalizing the loads of the two transistors 118 and 119 so as to obtain a symmetrical switching behaviour.

The collector current of the transistor 112 is controlled by a resistor array constituted by the resistors 121, 122 and 123. The signal b is available at the junction between the resistors 122 and 123. The collector current of the transistor 113 is switched by the modulation signal with the aid of the current switch constituted by the transistors 124 and 125. The collector current of the transistor 124 is controlled by the resistor 126 and the collector current of the transistor 125 is controlled by the resistor 127. A signal derived from the modulation signal is available at the collector of the transistor 125. By filtering this signal with the aid of a low-pas filter constituted by the resistor 128 and the capacitor 129, the cancelling signal c according to the invention is obtained. The resistor 126 is included for substantially mutually equalizing the loads of the transistors 124 and 125, so as to obtain a symmetrical switching behaviour.

I claim:

1. An electro-optical modulation circuit for modulating the optical output of an electro-optical converter in accordance with a received modulating signal while maintaining a selected bias level of said optical output which is independent of the received modulating signal; said modulation circuit comprising:

an opto-electrical converter optically coupled to said electro-optical converter;

a negative feedback path having an input and an output and including there-between said electro-optical converter, said opto-electrical converter and an automatic gain control amplifier in that order, the output of said automatic gain control amplifier being the output of said negative feedback path;

a control amplifier having a first input for receiving a DC bias reference voltage corresponding to said selected optical bias level, a second input coupled to the output of the negative feedback path for receiving an output signal of said path, and an output at which said control amplifier is adapted to produce a bias control signal corresponding to a combination of the signals at the inputs thereof;

combining means having a first input coupled to the output of said control amplifier and having an output coupled to the input of said negative feedback path so as to complete a negative feedback DC control loop which includes said negative feedback path, said control loop being operative to stabilize the optical output of said electro-optical converter at said selected bias level; and signal cancelling circuit means for deriving from the received modulating signal (i) a modulating current signal corresponding thereto and supplying said modulating current signal to a second input of said combining means, and (ii) a cancelling signal which is supplied to a third input of said control amplifier, said cancelling signal being the negative of a low frequency (including DC) component of the output signal of said negative feedback path caused by the modulating current signal supplied to the input of said negative feedback path via said combining means;

whereby the bias control signal produced by said control amplifier corresponds to said biasing reference voltage independently of any low frequency (including DC) component of the received modulating signal.

2. A modulation circuit as claimed in claim 1, further comprising means for supplying an auxiliary signal to a third input of said combining means, said combining means being adapted to provide said auxiliary signal to the input of said negative feedback path so as to result in an auxiliary signal component of the output signal of said negative feedback path; and means coupled to the output of said negative feedback path and responsive to said auxiliary signal component of the output signal thereof to control the gain of said automatic gain control amplifier in accordance with said auxiliary signal component.

3. A modulation circuit as claimed in claim 1, wherein said combining means is adapted to derive a summation of the signals supplied to the first, second and third inputs thereof.

4. A modulation circuit as claimed in claim 1, wherein said negative feedback path has a low-pass frequency transfer characteristic and the cancelling signal derived by said cancelling circuit means corresponds to the product of the transfer characteristic of said negative feedback path and the value of a low frequency (including DC) component of the received modulating signal.

5. A modulation circuit as claimed in claim 1, wherein said automatic gain control amplifier has a low-pass frequency transfer characteristic and said cancelling signal corresponds to the product of a transfer characteristic of said negative feedback path and the value of a low frequency (including DC) component of the received modulating signal.

6. A modulation circuit as claimed in claim 2, wherein said combining means is adapted to derive a summation of the signals supplied to the first, second and third inputs thereof.

7. A modulation circuit as claimed in claim 2, wherein said negative feedback path has a low-pass frequency transfer characteristic and the cancelling signal derived by said cancelling circuit means corresponds to the product of the transfer characteristic of said negative feedback path and the value of a low frequency (including DC) component of the received modulating signal.

8. A modulation circuit as claimed in claim 3, wherein said negative feedback path has a low-pass frequency transfer characteristic and the cancelling signal derived by said cancelling circuit means corresponds to the product of the transfer characteristic of said negative feedback path and the value of a low frequency (including DC) component of the received modulating signal.

9. A modulation circuit as claimed in claim 6, wherein said negative feedback path has a low-pass frequency transfer characteristic and the cancelling signal derived by said cancelling circuit means corresponds to the product of the transfer characteristic of said negative feedback path and the value of a low frequency (including DC) component of the received modulating signal.

10. A modulation circuit as claimed in claim 2, wherein said automatic gain control amplifier has a low-pass frequency transfer characteristic and said cancelling signal corresponds to the product of a transfer characteristic of said negative feedback path and the value of a low frequency (including DC) component of the received modulating signal.

11. A modulation circuit as claimed in claim 3, wherein said automatic gain control amplifier has a low-pass frequency transfer characteristic and said cancelling signal corresponds to the product of a transfer characteristic of said negative feedback path and the value of a low frequency (including DC) component of the received modulating signal.

12. A modulation circuit as claimed in claim 6, wherein said automatic gain control amplifier has a low-pass frequency transfer characteristic and said cancelling signal corresponds to the product of a transfer characteristic of said negative feedback path and the value of a low frequency (including DC) component of the received modulating signal.

* * * * *